US010811035B1

(12) United States Patent
Lee et al.

(10) Patent No.: US 10,811,035 B1
(45) Date of Patent: Oct. 20, 2020

(54) HEAT-ASSISTED MAGNETIC RECORDING HEAD WITH CONSTANT-WIDTH GAP BETWEEN NEAR-FIELD TRANSDUCER AND SIDE SHIELD

(71) Applicant: Seagate Technology LLC, Cupertino, CA (US)

(72) Inventors: TaeWoo Lee, Eden Prairie, MN (US); David M. Grundman, Shakopee, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/524,538

(22) Filed: Jul. 29, 2019

(51) Int. Cl.
*G11B 5/187* (2006.01)
*G11B 5/127* (2006.01)
*G11B 5/60* (2006.01)
*G11B 5/48* (2006.01)

(52) U.S. Cl.
CPC .......... *G11B 5/1872* (2013.01); *G11B 5/6088* (2013.01); *G11B 5/1278* (2013.01); *G11B 5/4866* (2013.01)

(58) Field of Classification Search
CPC ..... G11B 5/4866; G11B 5/6088; G11B 7/124; G11B 5/3116
See application file for complete search history.

(56) References Cited

U.S. PATENT DOCUMENTS

| | | | | |
|---|---|---|---|---|
| 7,272,102 B2* | 9/2007 | Challener | ................ | G02B 6/12 |
| | | | | 369/112.27 |
| 8,614,932 B1* | 12/2013 | Sasaki | .................... | G11B 5/314 |
| | | | | 369/13.17 |
| 9,053,717 B1* | 6/2015 | Matsumoto | .......... | G11B 5/4866 |
| 9,147,427 B1* | 9/2015 | Lee | ....................... | G11B 5/3133 |
| 9,218,827 B1* | 12/2015 | Sasaki | ...................... | G11B 5/17 |
| 9,218,835 B1* | 12/2015 | Sasaki | .................... | G11B 5/314 |
| 9,263,071 B1* | 2/2016 | Cao | ....................... | G11B 5/6088 |
| 9,741,377 B1* | 8/2017 | Sasaki | .................. | G11B 5/1272 |
| 9,761,253 B1* | 9/2017 | Sasaki | .................. | G11B 5/4866 |
| 9,852,752 B1* | 12/2017 | Chou | .................... | G11B 5/3163 |
| 9,852,753 B2 | 12/2017 | Peng | | |
| 10,068,596 B2* | 9/2018 | Staffaroni | ............. | G11B 5/3116 |
| 10,115,423 B1* | 10/2018 | Gubbins | .............. | G11B 5/6088 |
| 2009/0052077 A1* | 2/2009 | Tanaka | ..................... | G11B 5/02 |
| | | | | 360/59 |
| 2012/0020194 A1* | 1/2012 | Jin | ....................... | G11B 5/1278 |
| | | | | 369/13.13 |
| 2013/0100783 A1* | 4/2013 | Ostrowski | ............ | G11B 5/1278 |
| | | | | 369/13.33 |
| 2015/0071044 A1* | 3/2015 | Sasaki | .................... | G11B 13/08 |
| | | | | 369/13.17 |
| 2015/0262593 A1* | 9/2015 | Sasaki | .................... | G11B 5/314 |
| | | | | 369/13.17 |

(Continued)

*Primary Examiner* — Brian E Miller
(74) *Attorney, Agent, or Firm* — Mueting Raasch Group (57) ABSTRACT

A recording head includes a waveguide core and write pole extending to a media-facing surface of the recording head. A near-field transducer is located between the waveguide core and the write pole. First and second side shields are located on either crosstrack side of the near-field transducer. The first and second shields have edges facing and conformal with first and second tapered sides and a peg of the near-field transducer such that there are respective first and second constant-width gaps therebetween.

20 Claims, 9 Drawing Sheets

(56) References Cited

U.S. PATENT DOCUMENTS

| | | | |
|---|---|---|---|
| 2015/0325261 A1* | 11/2015 | Yang | G11B 5/3133 |
| | | | 369/13.33 |
| 2016/0343391 A1* | 11/2016 | Sasaki | G11B 5/315 |
| 2016/0351214 A1* | 12/2016 | Kautzky | G11B 5/3109 |
| 2017/0213571 A1* | 7/2017 | Kautzky | G11B 5/3133 |
| 2017/0249958 A1* | 8/2017 | Blaber | G11B 5/4866 |
| 2017/0249962 A1* | 8/2017 | Peng | G11B 5/6088 |
| 2018/0096702 A1* | 4/2018 | Staffaroni | G11B 5/3906 |

* cited by examiner

HEAT-ASSISTED MAGNETIC RECORDING HEAD WITH CONSTANT-WIDTH GAP BETWEEN NEAR-FIELD TRANSDUCER AND SIDE SHIELD

SUMMARY

The present disclosure is directed to a heat-assisted magnetic recording head with a constant width near-field transducer to side shield gap. In one embodiment, a recording head includes a waveguide core extending to a media-facing surface of the recording head. A write pole extends to the media-facing surface and downtrack from the waveguide core. A near-field transducer is located between the waveguide core and the write pole. The near-field transducer has an enlarged part with first and second tapered sides that are joined by a peg at the media-facing surface. The peg extending towards and normal to the media facing surface. First and second side shields are located on either crosstrack side of the near-field transducer. The first and second shields have edges facing and conformal with the first and second sides and the peg of the near-field transducer such that there are respective first and second constant-width gaps therebetween.

In another embodiment, a recording head includes a waveguide core extending to a media-facing surface of the recording head. A write pole extends to the media-facing surface and downtrack from the waveguide core. A near-field transducer is located between the waveguide core and the write pole. The near-field transducer has an enlarged part and the peg extend from the enlarged part towards and normal to the media facing surface. First and second side shields are located on either crosstrack side of the near-field transducer. The first and second side shields form first and second gaps near the peg and a lower portion of the enlarged part. The first and second gaps have a first part normal and proximate to the media-facing surface and a second part at an angle to the media-facing surface. The first and second parts form a path with constant cross-section normal to the path along the peg and enlarged part.

In another embodiment, a method involves directing light into a waveguide core that extends to a media-facing surface of the recording head. The light from the waveguide core is coupled to a near-field transducer between the waveguide core and the write pole. The coupled light causes near-field plasmons to be directed from a peg of the near-field transducer to a recording medium. Spreading of the near-field plasmons proximate the peg is reduced via first and second side shields on either crosstrack side of the near-field transducer. The first and second shields have edges facing and conformal with first and second sides and the peg of the near-field transducer such that there are respective first and second constant-width gaps therebetween.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and excites the near-field transducer.

Currently employed NFTs may use a hybrid bilayer which combines enhanced reliability of a robust first material (e.g., Rh, Ir) with low-plasmonic-loss second material (e.g., Au). The NFT includes an enlarged part which receives light energy from the waveguide and funnels this energy, which is in the form of surface plasmon polaritons (SPP), to a peg that extends from the enlarged part towards the recording medium. The peg directs the SPP to the recording medium, which creates a hotspot that facilitates writing via the magnetic field.

In order to improve the potential areal data density (ADC), the hotspot should have a high thermal gradient, which results in sharper transitions of the magnetic fields that define the recorded bits. One way to achieve this high thermal gradient is to increase optical field localization at the peg area of the NFT. In embodiments described below, a reflective metal such as Rh, Au, Ir is shaped and located in the vicinity of both crosstrack sides of the peg to induce optical resonance with peg. This prevents the field from spreading in proximity to the NFT peg.

Figure 1:
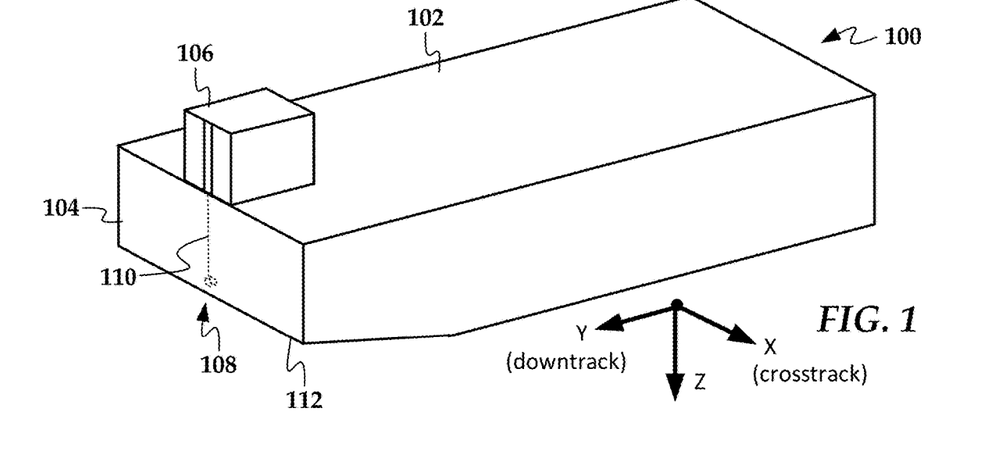
FIG. 1 is a perspective view of a slider assembly according to an example embodiment.

In reference now to FIG. 1, a perspective view shows a recording head 100 according to an example embodiment. The recording head 100 may be used in a magnetic data storage device, e.g., HAMR hard disk drive. The recording head 100 may also be referred to herein interchangeably as a slider, head, write head, read head, read/write head, etc. The recording head 100 has a slider body 102 with read/ write transducers 108 at a trailing edge 104 that are held proximate to a surface of a magnetic recording medium (not shown), e.g., a magnetic disk.

The illustrated recording head 100 is configured as a HAMR device, and so includes optical components that form a hot spot on the recording medium near the read/write transducers 108. These HAMR components include an energy source 106 (e.g., laser diode) mounted to the slider body 102 and a waveguide 110 (e.g., a dielectric waveguide) integrated into the slider body 102. The waveguide 110 delivers electromagnetic energy from the energy source 106 to a near-field transducer (NFT) that is part of the read/write transducers 108. The NFT achieves surface plasmon resonance and directs the energy out of a media-facing surface 112 (also referred to herein as an air-bearing surface, or ABS) to create a small hot spot in the recording medium.

Figure 2:
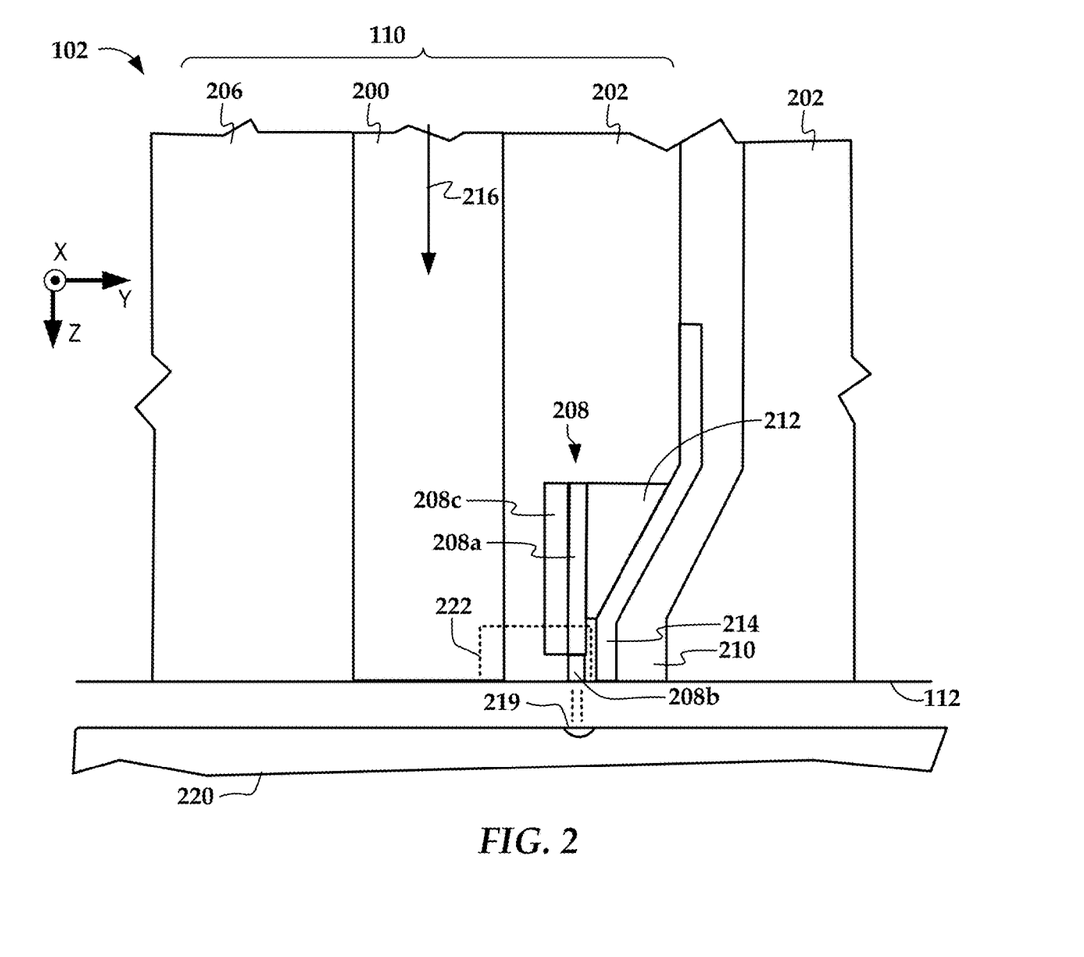
FIG. 2 is a cross-sectional view of a slider along a down-track plane according to according to an example embodiment.

In FIG. 2, a cross-sectional view shows details of a slider body 102 according to an example embodiment. The waveguide 110 includes a core 200, top cladding layer 202 and bottom cladding 206. Other cladding layers not shown in this figure may be used with this waveguide 110, such as middle and side cladding. The core 200 delivers light to an NFT 208 that is located at the media-facing surface 112. A write pole 210 (also referred to herein as a "magnetic pole") is located near the NFT 208. A heat sink 212 thermally couples the NFT 208 to the write pole 210. A diffusion barrier 214 is shown between the heat sink 212 and the write pole 210. A magnetic coil (not shown) induces a magnetic field through the write pole 210 in response to an applied current. During recording, the waveguide 110 delivers light 216 from a light source to the NFT 208. The NFT 208 directs surface plasmons out of the media-facing surface 112 to form a hotspot 219 within a recording layer of a moving recording medium 220. The write pole 210 sets a magnetic orientation in the hotspot 219, thereby writing data to the recording medium 220.

In this configuration, the NFT 208 includes an enlarged part 208a and a peg 208b extending from the enlarged part 208 towards and normal to the media facing surface 112. The NFT 208 may be made from a mechanically robust material such as Rh or Ir. A mechanically robust material can increase the life of the recording head 100, as it is less susceptible to deformation, voiding, etc., that can occur with components located at the media-facing surface 112. The mechanically robust material is generally does not make an efficient plasmonic resonator compared to other commonly used NFT materials such as Au, Ag, Cu, etc. In order to increase coupling efficiency, the NFT 208 may include a plasmonic plate 208c coupled to a side of the enlarged part 208a that faces the waveguide core 200. This plasmonic plate 208c may be made from Au or other efficient plasmonic resonator materials, and is recessed from the media-facing surface 112 to prevent field broadening by near-field induced by the front edge (toward media 112) of 208c. As seen in subsequent figures, the plasmonic 208c plate may have an outline (on the xz-plane) that conforms to a corresponding outline of the enlarged part 208a. The heat sink 212 may also be made from Au or other materials with high thermal conductivity.

Figure 3:
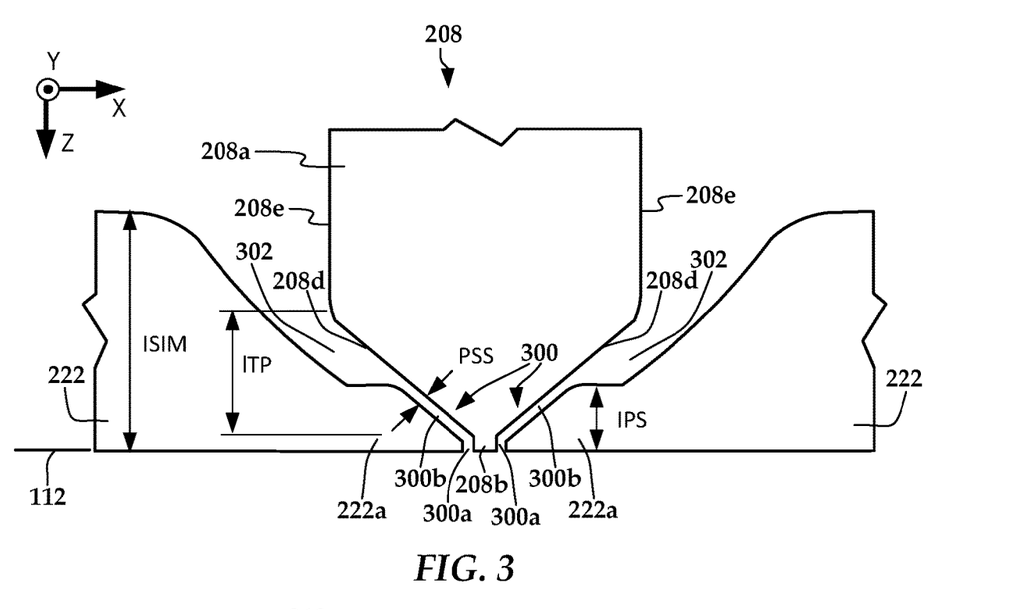
FIG. 3 is a substrate-parallel plane view of a near-field transducer and side shields according to an example embodiment.

The slider body 102 also includes first and second side shields 222 on either crosstrack side of the near-field transducer 208. The first and second side shields 222 reduce spreading of near-field plasmons proximate the peg 208b. In FIG. 3, a plan view of the NFT 208 on a substrate-parallel plane shows details of both the NFT 208 and the side shields 222. The first and second shields 220 have edges 220a facing and conformal with first and second sides 208d and the peg 208b of the near-field transducer 208 such that there are respective first and second constant-width gaps 300 therebetween. Note that for purposes of this disclosure, the gaps 300 are defined as the regions between at least part of the side shields 220 and the enlarged part 208a and peg 208b. The material that forms the gaps 300 (e.g., a dielectric) may also extend above and below the NFT 208 in the downtrack (y-direction), and in these regions away from the NFT 208 the same material may have a non-constant cross-sectional shape.

The slider body 102 also includes first and second side shields 222 on either crosstrack side of the near-field transducer 208. The first and second side shields 222 reduce spreading of near-field plasmons proximate the peg 208b. In FIG. 3, a plan view of the NFT 208 on a substrate-parallel plane shows details of both the NFT 208 and the side shields 222. The first and second shields 222 have edges 222a facing and conformal with first and second sides 208d and the peg 208b of the near-field transducer 208 such that there are respective first and second constant-width gaps 300 therebetween. Note that for purposes of this disclosure, the gaps 300 are defined as the regions between at least part of the side shields 222 and the enlarged part 208a and peg 208b. The material that forms the gaps 300 (e.g., a dielectric) may also extend above and below the NFT 208 in the downtrack (y-direction), and in these regions away from the NFT 208 the same material may have a non-constant cross-sectional shape.

Note that the gaps 300 extend along protruding parts 222a of the side shields 222. The parts 222a have a dimension lPS from the media-facing surface 112 that is less than a distance lTP to which the tapered sides 208d extend before they transition to become vertical sides 208e. The dimension lPS is also less than dimension lSIM, which is a distance that the side shields 222 extend away from the media-facing surface 112 away from the NFT 208. Thus the protruding parts 222a extend towards the NFT 208 in opposite crosstrack directions to form the gaps 300 near the peg 208b and a lower portion of the enlarged part 208a, but result in a larger (and possibly non-conforming) gaps 302 away from the media-facing surface 112.

Generally, the gaps 300 each have a first part 300a that is normal and proximate to the media facing surface 112 and that conforms to the crosstrack edges of the peg 208b. The gaps 300 each have a second part 300b that are at an angle to the media-facing surface 112 and that conform to the edge shape of the NFT enlarged part 208a. These parts 300a, 300b form a path, such that the cross-sectional shape of the gap 300 along the path is substantially constant (e.g., within manufacturing tolerances). This type of gap 300 can be used with other NFT edge shapes instead of the illustrated linear sides 208d. For example, the NFT enlarged part could have smoothly curved sides (e.g., circular, parabolic, logarithmic) and/or piecewise linear sides with two or more sections at an angle to the media-facing surface.

Figure 4:
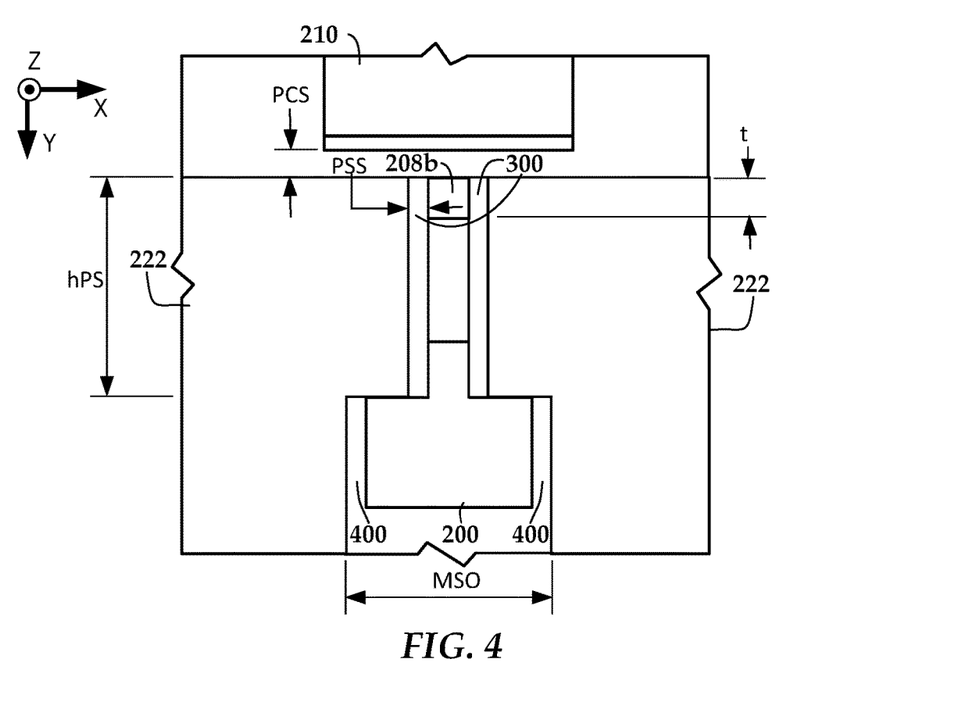
FIG. 4 is an air-bearing surface view of the near-field transducer and side shields shown in FIG. 3.

In FIG. 4, a view from the media-facing surface shows additional details of the NFT 208 and side shields 222. As this view shows, the first and second side shields 222 have a downtrack dimension (hPS) that is greater than that of the near-field transducer 208 such that the first and second side shields 222 extend partially into the waveguide core 200. Further, the shields 222 may extend further past the core 200 in the downtrack direction than hPS, where a crosstrack separation between the first and second side shields 222 widens to the indicated MSO dimension. In this region where the shields 222 have widened, the first and second side shields 222 are separated from crosstrack sides of the core 200 by third and fourth constant thickness gaps 400, which may also be filled with the same material as the first and second gaps 300.

Also seen in FIGS. 3 and 4 is the width dimension PSS of the first and second constant-width gaps 300. The dimension PSS is the same between the side shields 222 and the edges 208*d* of the enlarged part 208*a* as it is between the side shields 222 and the peg 208*b*. A corresponding dimension t in the downtrack direction (see FIG. 4) also defines the cross-section of the gap 300 together with PSS. Generally, the dimension t is the deposited thickness of the peg 208*b* and enlarged part 208*a*.

Figure 5:
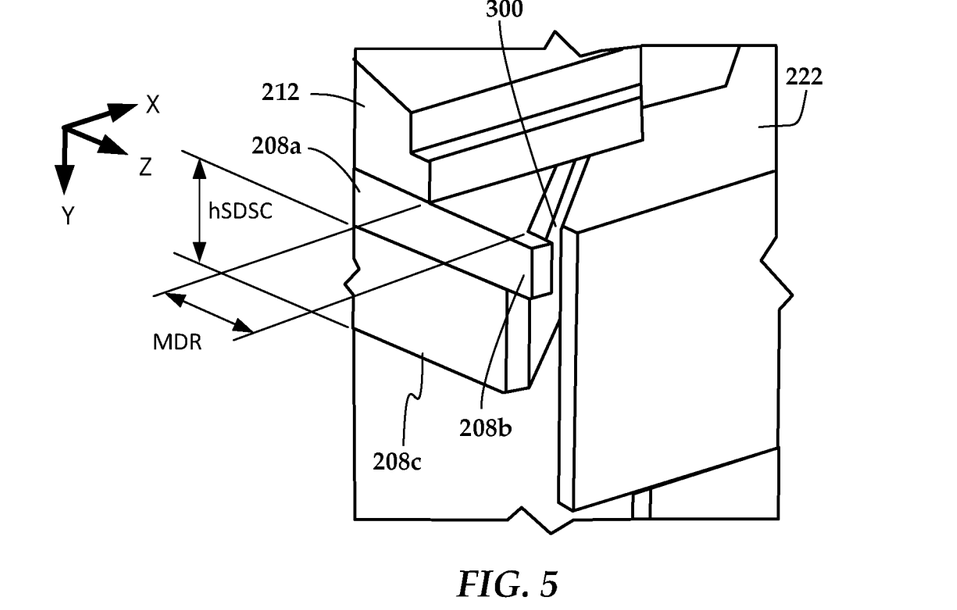
FIG. 5 is a perspective cutaway view of the near-field transducer and side shields shown in FIG. 3.

In FIG. 5, a cross-sectional perspective view shows additional details of the NFT 208 and side shields 222. In this view, the plasmonic plate 208*c* can be seen, as well as the heat sink 212. The plasmonic plate 208*c* has a downtrack dimension hSDSC and the heat sink 212 is recessed from the base of the peg 208*b* by distance MDR. As noted above, the material for the side shields 222 and NFT 208 can be any combinations of Au, Au—Y2O3, Rh, Ir, W, Pt, and alloys thereof. In some examples described herein, the enlarged part 208*a*, peg 208*b*, and side shields 222 are made of Rh, and the plasmonic plate 208*c* and heat sink 212 are made of Au.

Figure 6:
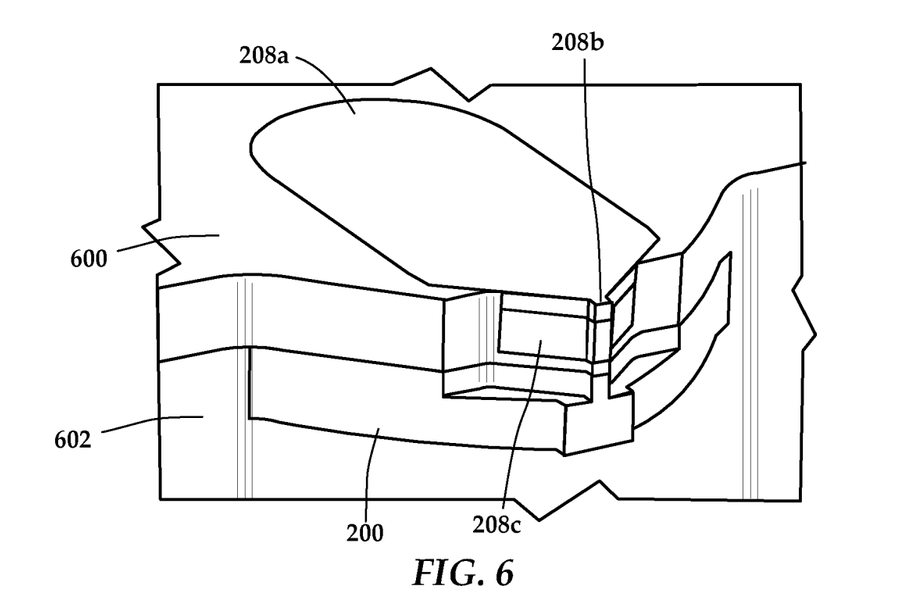
FIGS. 6, 7, and 8 are cross-sectional perspective views showing fabrication of side shields according to example embodiments.
Figure 7:
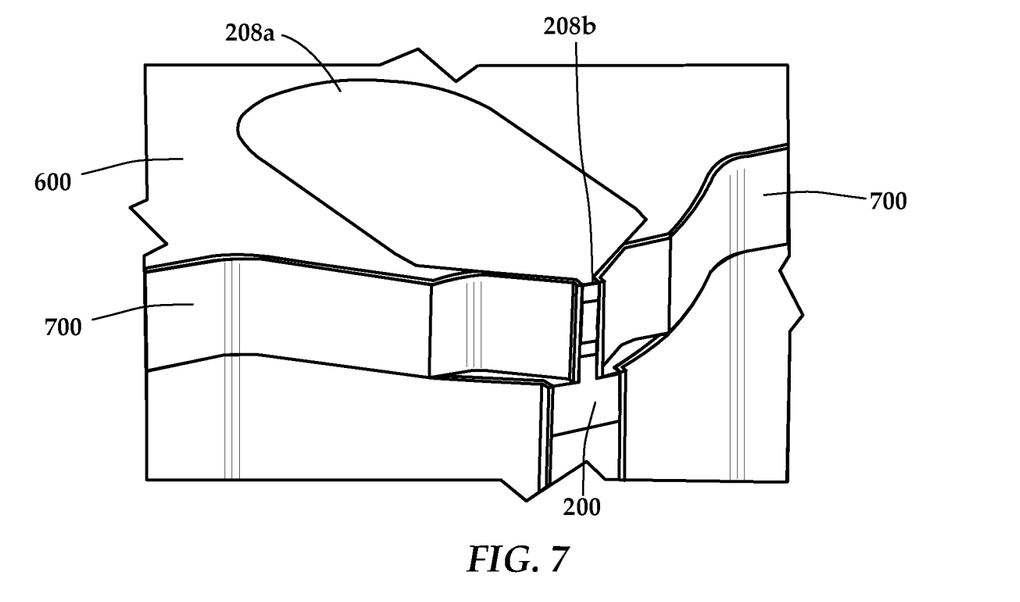
Figure 8:
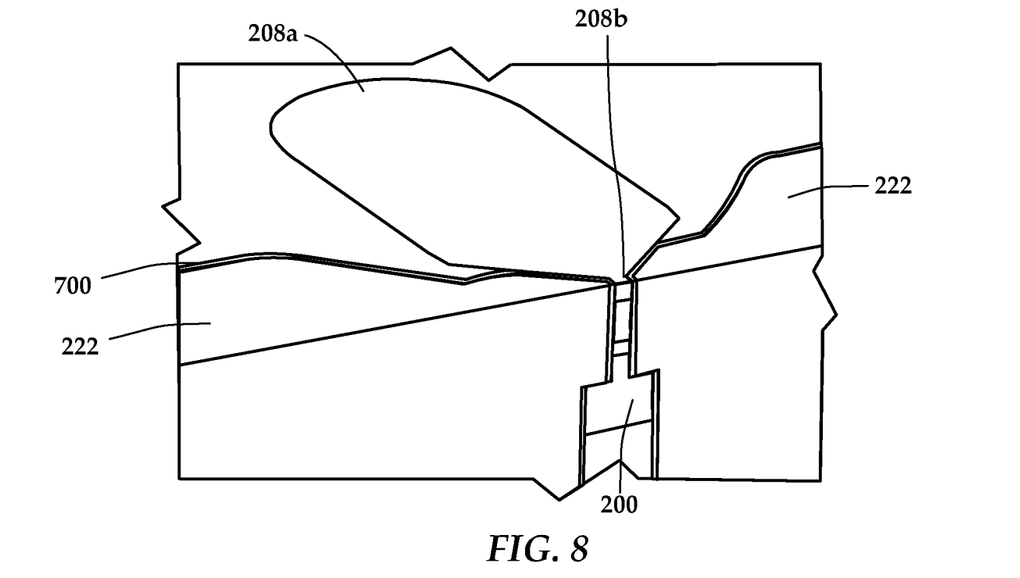

The dimension PSS of the gap 300 shown in FIGS. 3 and 4 can be precisely controlled by a spacer layer which fills the gap 300. The material filling the gap 300 may be a dielectric such as $SiO_2$. In FIGS. 6-8, a series of perspective views shows how the gap 300 and shields 222 may be formed. In FIG. 6, the waveguide core 200 has been deposited on a first layer dielectric material 602, followed by a second layer of dielectric material 600. The plasmonic plate 208*c* of the NFT 208 has been formed within this layer 600 of dielectric material, followed by the enlarged part 208*a* and peg 208*b*, which are a single, contiguous part. Note that the material 600 may be deposited in multiple steps, e.g., before and after shaping of the parts of the NFT 208 via photolithography.

The region facing the front of the figure (which will face the recoding medium in the finished recording head) is shaped as shown in FIG. 6 to conform to the desired shape of one side of the shields that face the NFT 208, e.g., via masking and etching away the layers of material to achieve the indicated shape. As shown in FIG. 7, a dielectric material layer 700, e.g., SiO2, is deposited to a desired thickness over the front surfaces of the NFT 208 and waveguide core 200. As shown in FIG. 8, the material that forms the side shields 222 is deposited, being separated from the NFT peg 208*b* and enlarged part 208*a* by a constant thickness gap filled with dielectric 700.

Figure 9:
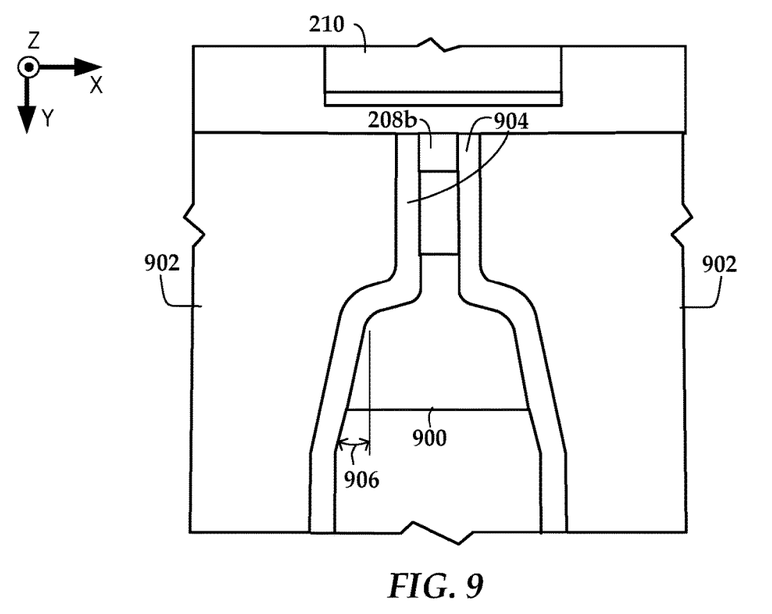
FIG. 9 is an air-bearing surface view of a near-field transducer and side shields according to another example embodiment.

In FIG. 9, a media-facing surface view shows side-shields 902 according to another example embodiment. This configuration may use an NFT 208 the same or similar to previous embodiments, as indicated by peg 208*b*. Similarly, a write pole 210 as previously described extends to the media-facing surface. A waveguide core 900 extends to a media-facing surface and is located downtrack from the NFT peg 208*b*. First and second side shields 902 are on either crosstrack side of the NFT peg 208. As with the other embodiments, the first and second shields 902 have edges facing and conformal with the first and second NFT sides 208*d* (see FIG. 3) and the peg 208*b* such that there are respective first and second constant-width dielectric gaps 904 between the NFT sides 208 and edges of the shields 902.

In this example, the shields 902 and the waveguide core 900 are rounded and sloped, the latter being indicated by angle 906 which is a non-zero angle relative to a downtrack-parallel reference line (the y-axis in this example). Also, the dielectric gaps 904 fully separate the core 900 and the shields 902, as opposed to the embodiment shown in FIG. 4, where the core 200 and shields 222 are in contact on the xz-plane. This embodiment may be formed in a similar way as what is shown in FIGS. 6-8, except that the media-facing surface contours are somewhat different and the dielectric material layer that covers these surface contours also covers the entire exposed part of the core 900. The configuration shown in FIG. 9 has been shown in simulation to provide a gain in crosstrack thermal gradient in the media hotspot, e.g., around 0.2 K/nm.

Figure 10:
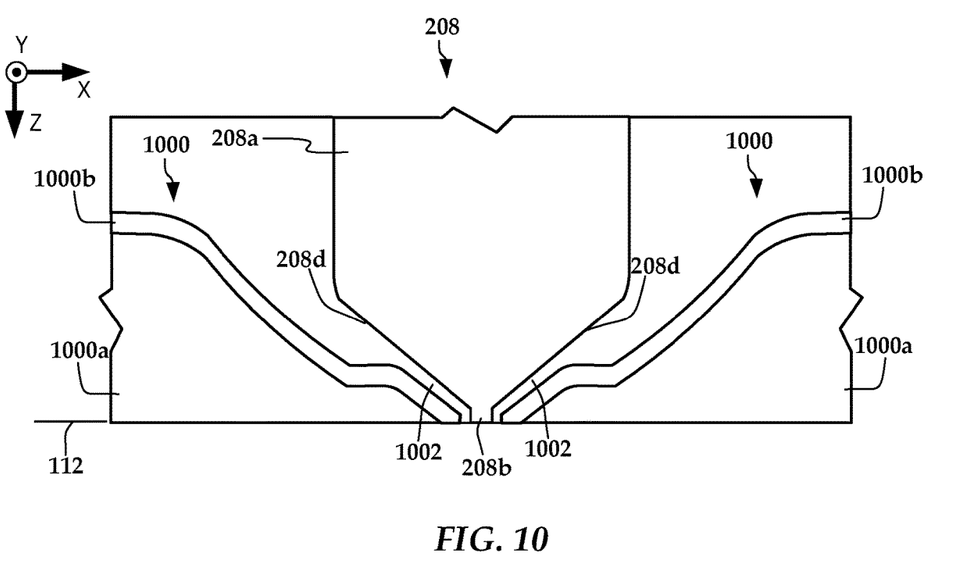
FIG. 10 is a substrate parallel plane view of a near-field transducer and side shields according to another example embodiment.

In FIG. 10, a substrate-parallel plane view shows side-shields according to another example embodiment. This configuration may use an NFT 208 the same or similar to previous embodiments, which includes enlarged part 208*a* and peg 208*b*. First and second side shields 1000 are on either crosstrack side of the NFT 208. The first and second shields 1000 have edges facing and conformal with the first and second NFT sides 208*d* and the peg 208*b* such that there are respective first and second constant-width gaps 1002 therebetween.

In this example, the shields 1000 are formed of a main part 1000*a* and a liner 1000*b* that faces the NFT 208. Generally, the main part 1000*a* may be formed of a mechanically robust first material such as Rh, Ir, etc., and the liner 1000*b* may be formed of a highly reflective second material such as Au, Ag, etc. This embodiment may be formed in a similar way as what is shown in FIGS. 6-8, except that a layer material that forms the liner 1000*b* is deposited after the dielectric material layer that forms the gap 1002 and before the material that forms the main part 1000*a*. Note that this type of liner may also be used with the embodiment shown in FIG. 9.

Figure 11:
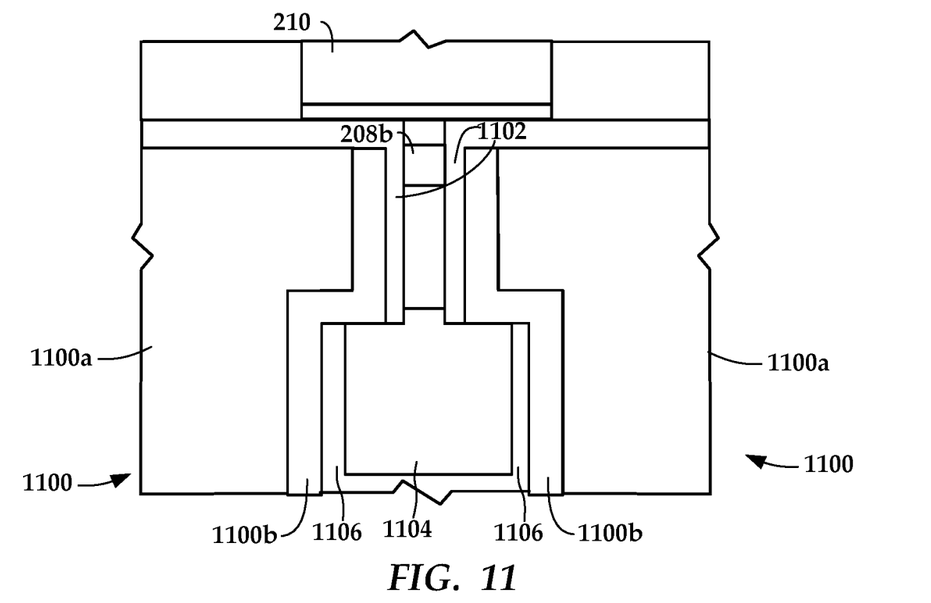
FIGS. 11 and 12 are air-bearing surface and cutaway perspective views of a near-field transducer and side shields according to another example embodiment.
Figure 12:
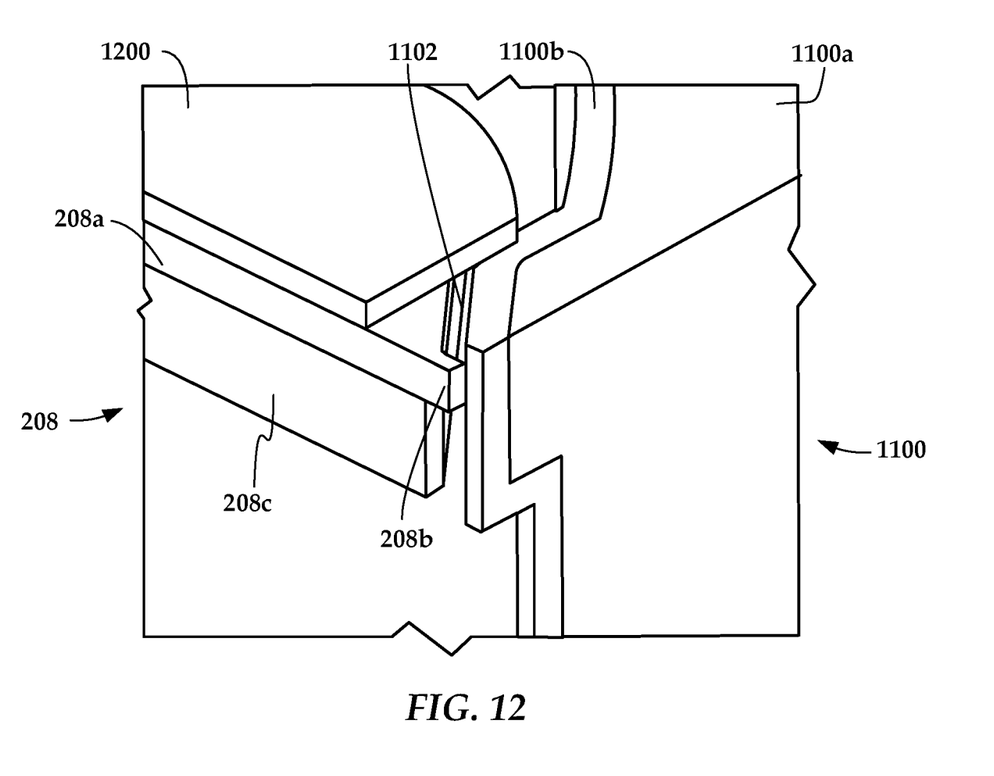

In FIGS. 11 and 12, respective media-facing and perspective views show details of side shields according to another example embodiment. This embodiment includes shields 1100 each with a main part 1100*a* and liner 1100*b* similar to what is shown in FIG. 10. The shields 1100 are separated from the NFT 208 by constant thickness gaps 1102. As seen in FIG. 11, the shields 1100 partially intersect a waveguide core 1104. At the point of this intersection, the crosstrack separation between the shields 1100 widens and extends past the waveguide core to form third and fourth cross-sectional gaps 1106. As seen in FIG. 12, a heat sink 1200 covers the enlarged part 208*a* of the NFT 208 and also overlaps the liner 1100*b* of the shield 1100*b*. This is a symmetric cross-section, so the heat sink 1200 will contact the liner 1100*b* on the other crosstrack side of the NFT 208 as well.

Figure 13:
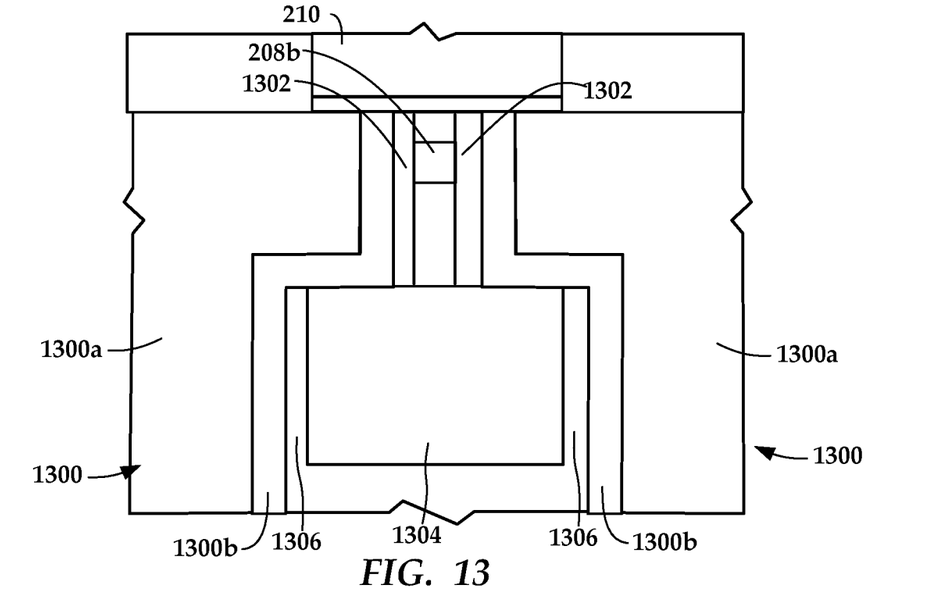
FIGS. 13 and 14 are air-bearing surface and cutaway perspective views of a near-field transducer and side shields according to another example embodiment.
Figure 14:
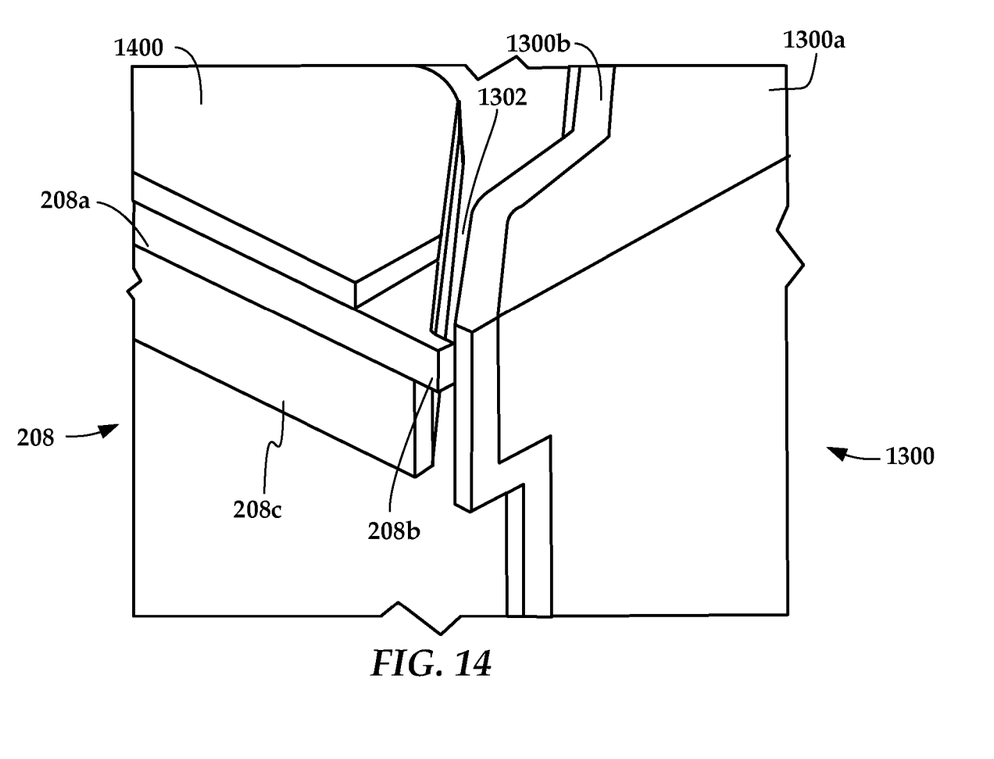

In FIGS. 13 and 14, respective media-facing and perspective views show details of side shields according to another example embodiment. This embodiment includes shields 1300 each with a main part 1300*a* and liner 1300*b* similar to what is shown in FIG. 10. The shields 1300 are separated from the NFT 208 by constant thickness gaps 1302. As seen in FIG. 13, the shields 1300 do not intersect waveguide core 1304, although the liner 1300*b* contacts the core 1304. Past this point of contact, the crosstrack separation between the shields 1300 widens and extends past the waveguide core to form third and fourth cross-sectional gaps 1306. As seen in FIG. 14, a heat sink 1400 has edges that conform to that of the enlarged part 208*a* of the NFT 208 so that the heat shield 1400 is also spaced apart from the side shields by the distance of the gap 1302. This is a symmetric cross-section, so the heat sink 1400 will be spaced apart from the side shield 1300 on the other crosstrack side of the NFT 208.

Figure 15:
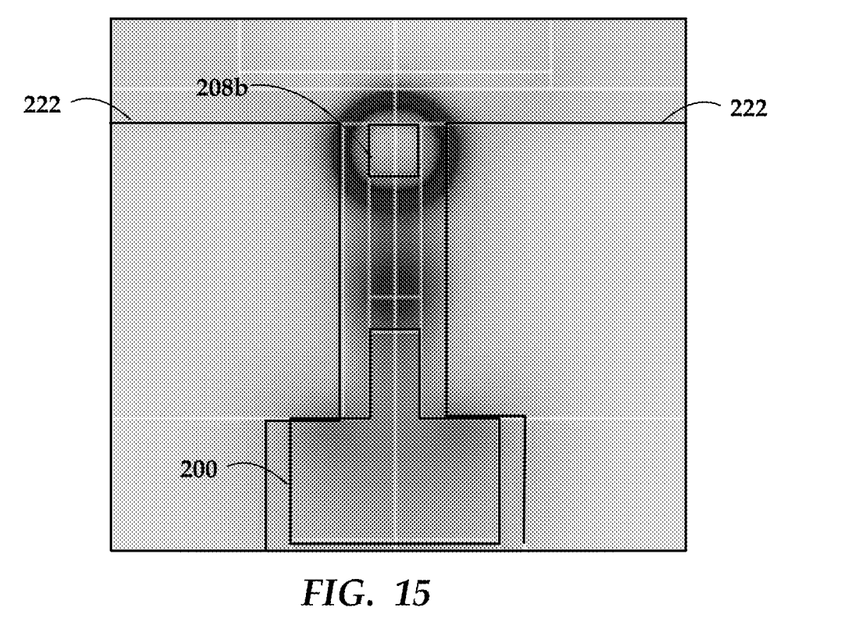
FIGS. 15, 16, and 17 are plots showing a simulation of the configurations shown in FIGS. 2, 11, and 13, respectively.
Figure 16:
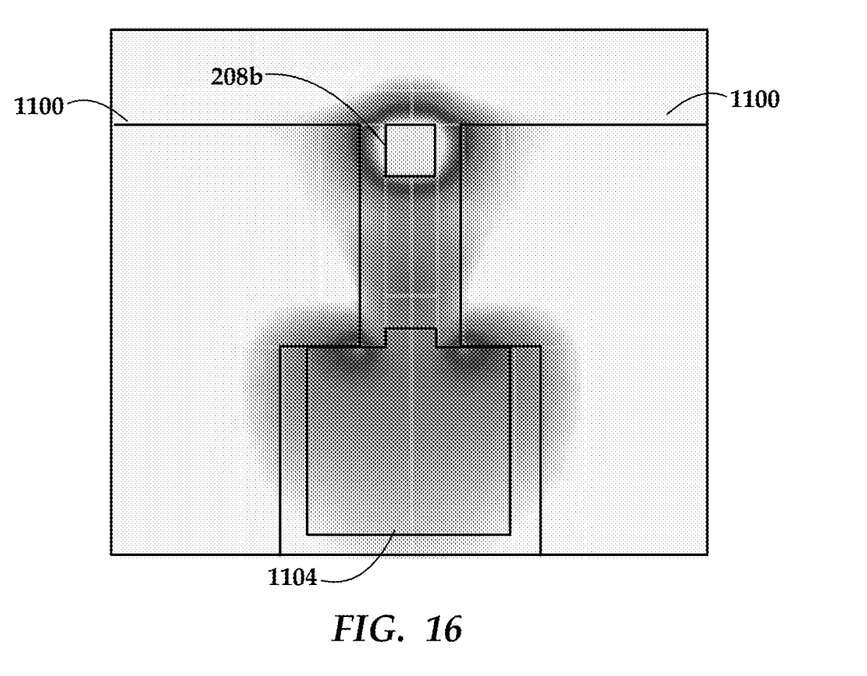
Figure 17:
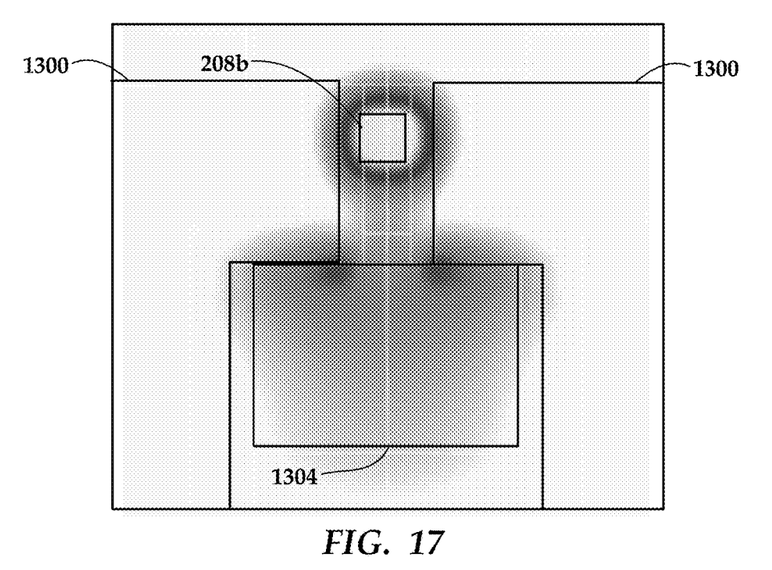

In FIGS. 15, 16, and 17, plots show simulation results for the configurations shown in FIGS. 2, 11, and 13, respectively. In each of the plots, the outline of the peg 208b is indicated, as well as the outline of each of the cores 200, 1104, 1304 and shields 222, 1100, 1300. In all of these cases, the NFT 208 was modeled with Rh enlarged part 208a and peg 208b and Au plasmonic disk 208c. Shields 222 were modeled as Rh, while shields 1100 and 1300 were modeled as Rh with an Au liner. The plots indicate electrical field |E|, with maximum values centered over the peg 208b and some areas with relatively high value near regions of the cores 1104, 1304, 200 that face the peg 208b. In Table 1 below, results of this simulation are summarized, with the parenthetical value indicating a change over the design shown in FIG. 2, which is used as a baseline to gauge the effect of the Au liner on the side shields 1100, 1300. In the Table 1, DTTG and CTTG refer to downtrack and crosstrack thermal gradient of the hotspot, LP refers to required laser power, and Peg and Disk T refer to maximum temperatures at the peg 208b and disk 208c.

TABLE 1

| Design | DTTG, K/nm | CTTG, K/nm | Peg T, K | Disk T, K | LP, mW |
|---|---|---|---|---|---|
| FIG. 2 | 12.5 | 12.9 | 381 | 212 | 7.5 |
| FIG. 11 | 11.5 (−1) | 10.9 (−2) | 309 (−72) | 154 (−58) | 4.9 (−2.5) |
| FIG. 13 | 12.2 (−0.3) | 13.2 (+0.3) | 316 (−65) | 157 (−55) | 4.2 (−3.3) |

Figure 18:
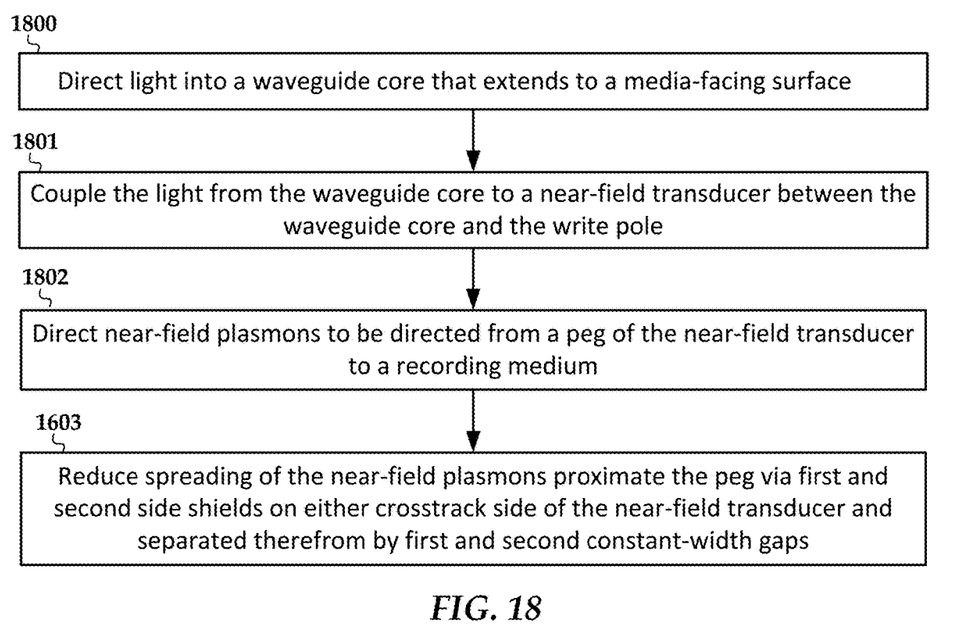
FIG. 18 is a flowchart of a method according to an example embodiment.

In FIG. 18, a flowchart shows a method according to an example embodiment. The method involves directing 1800 light into a waveguide core that extends to a media-facing surface of the recording head. The light from the waveguide core is coupled 1801 to a near-field transducer between the waveguide core and the write pole. The near-field transducer has an enlarged part with first and second tapered sides that are joined by a peg at the media-facing surface. The coupled light causes near-field plasmons to be directed 1802 from the peg to a recording medium. First and second side shields on either crosstrack side of the near-field transducer reduce spreading 1803 of the near-field plasmons proximate the peg. The first and second shields having edges facing and conformal with the first and second sides and the peg of the near-field transducer such that there are respective first and second constant-width gaps therebetween.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head comprising:
  a waveguide core extending to a media-facing surface of the recording head;
  a write pole extending to the media-facing surface and downtrack from the waveguide core;
  a near-field transducer between the waveguide core and the write pole, the near-field transducer comprising an enlarged part with first and second tapered sides that are joined by a peg at the media-facing surface, the peg extending towards and normal to the media facing surface; and
  first and second side shields on either crosstrack side of the near-field transducer, the first and second shields having edges facing and conformal with the first and second tapered sides and the peg of the near-field transducer such that there are respective first and second constant-width gaps therebetween, the first and second shields being formed of a first material facing the media-facing surface and a liner of a second material facing the near-field transducer, the first material being more mechanically robust than the second material, the second material being more reflective than the first material.

2. The recording head of claim 1, wherein the first and second constant-width gaps have the same width (PSS).

3. The recording head of claim 1, wherein the first and second side shields have a downtrack dimension that is greater than that of the near-field transducer such that the first and second side shields extend partially into the waveguide core.

4. The recording head of claim 1, wherein first and second side shields reduce spreading of near-field plasmons proximate the peg.

5. The recording head of claim 1, wherein the first and second side shields comprise respective first and second protruding parts extending towards the near-field transducer in opposite crosstrack directions to form the first and second gaps near the peg and a lower portion of the enlarged part, first and second protruding parts forming first and second larger, non-conforming gaps away from the media-facing surface.

6. The recording head of claim 1, wherein the near-field transducer further comprises a plasmonic plate having an outline that conforms to a corresponding outline of the enlarged part, the plasmonic plate coupled to a side of the enlarged part that faces the waveguide core.

7. A recording head comprising:
  a waveguide core extending to a media-facing surface of the recording head;
  a write pole extending to the media-facing surface and downtrack from the waveguide core;
  a near-field transducer between the waveguide core and the write pole, the near-field transducer comprising an enlarged part with first and second tapered sides that are joined by a peg at the media-facing surface, the peg extending towards and normal to the media facing surface; and
  first and second side shields on either crosstrack side of the near-field transducer, the first and second shields having edges facing and conformal with the first and second tapered sides and the peg of the near-field transducer such that there are respective first and second constant-width gaps therebetween, the first and second side shields extending beyond the waveguide core in a downtrack direction, the first and second side shields separated from crosstrack sides of the waveguide core by third and fourth constant cross-section dielectric gaps.

8. The recording head of claim 7, wherein regions of the first and second side shields facing the waveguide core are rounded and sloped.

9. The recording head of claim 1, wherein the first and second side shields and the near-field transducer are metallic, and first and second gaps are filled with a dielectric.

10. A recording head comprising:
 a waveguide core extending to a media-facing surface of the recording head;
 a write pole extending to the media-facing surface and downtrack from the waveguide core;
 a near-field transducer between the waveguide core and the write pole, the near-field transducer comprising an enlarged part and the peg extend from the enlarged part towards and normal to the media facing surface; and
 first and second side shields on either crosstrack side of the near-field transducer, the first and second side shields forming first and second gaps near the peg and a lower portion of the enlarged part, the first and second gaps having a first part normal and proximate to the media-facing surface and a second part at an angle to the media-facing surface, the first and second parts forming a path with constant cross-section normal to the path along the peg and enlarged part, the first and second side shields having a downtrack dimension that is greater than that of the near-field transducer such that the first and second side shields extend partially into the waveguide core.

11. The recording head of claim 10, wherein first and second side shields reduce spreading of near field plasmons proximate the peg.

12. The recording head of claim 10, wherein the first and second side shields comprise respective first and second protruding parts extending towards the near-field transducer in opposite crosstrack directions to form the first and second gaps near the peg and a lower portion of the enlarged part, first and second protruding parts forming first and second larger, non-conforming gaps away from the media-facing surface.

13. The recording head of claim 10, wherein the first and second shields are formed of a first material facing the media-facing surface and a liner of a second material facing the near-field transducer, the first material being more mechanically robust than the second material, the second material being more reflective than the first material.

14. The recording head of claim 10, wherein the near-field transducer further comprises a plasmonic plate having an outline that conforms to a corresponding outline of the enlarged part, the plasmonic plate coupled to a side of the enlarged part that faces the waveguide core.

15. The recording head of claim 10, wherein the first and second side shields extend beyond the waveguide core in a downtrack direction, the first and second side shields separated from crosstrack sides of the waveguide core by third and fourth constant cross-section gaps.

16. The recording head of claim 15, wherein regions of the first and second side shields facing the waveguide core are rounded and sloped.

17. A method comprising:
 directing light into a waveguide core that extends to a media-facing surface of the recording head;
 coupling the light from the waveguide core to a near-field transducer between the waveguide core and the write pole, the near-field transducer comprising an enlarged part with first and second tapered sides that are joined by a peg at the media-facing surface, the coupled light causing near-field plasmons to be directed from the peg to a recording medium; and
 reducing spreading of the near-field plasmons proximate the peg via first and second side shields on either crosstrack side of the near-field transducer, the first and second shields having edges facing and conformal with the first and second sides and the peg of the near-field transducer such that there are respective first and second constant-width gaps therebetween, the first and second shields being formed of a first material facing the media-facing surface and a liner of a second material facing the near-field transducer, the first material being more mechanically robust than the second material, the second material being more reflective than the first material.

18. The method of claim 17, further comprising generating a magnetic field via a write pole that extends to the media-facing surface and is downtrack from the waveguide core, the magnetic field changing a magnetic orientation of a hotspot in the recording medium, the hotspot being formed by the near-field plasmons.

19. The method of claim 17, wherein the first and second side shields have a downtrack dimension that is greater than that of the near-field transducer such that the first and second side shields extend partially into the waveguide core.

20. The method of claim 17, wherein the first and second side shields extend beyond the waveguide core in a downtrack direction, the first and second side shields separated from crosstrack sides of the waveguide core by third and fourth constant cross-section dielectric gaps.

* * * * *